United States Patent
Sørvik et al.

(10) Patent No.: US 8,943,734 B2
(45) Date of Patent: Feb. 3, 2015

(54) FISHING PROTECTOR

(75) Inventors: Omar Sørvik, Sagvåg (NO); Odd Arild Paulsen, Bremnes (NO)

(73) Assignee: Sørinwest A/S, Sagvag (NO)

( * ) Notice: Subject to any disclaimer, the term of this patent is extended or adjusted under 35 U.S.C. 154(b) by 521 days.

(21) Appl. No.: 13/391,235

(22) PCT Filed: Aug. 20, 2010

(86) PCT No.: PCT/NO2010/000312
§ 371 (c)(1),
(2), (4) Date: Jul. 5, 2012

(87) PCT Pub. No.: WO2011/021946
PCT Pub. Date: Feb. 24, 2011

(65) Prior Publication Data
US 2012/0260557 A1    Oct. 18, 2012

(30) Foreign Application Priority Data
Aug. 20, 2009    (NO) .................................. 20092870

(51) Int. Cl.
*A01K 97/14*    (2006.01)
*A01K 91/18*    (2006.01)

(52) U.S. Cl.
CPC ...................................... *A01K 91/18* (2013.01)
USPC ..................... 43/5; 43/4.5; 43/43.2; 43/43.15

(58) Field of Classification Search
USPC ...................... 43/5, 4.5, 43.1, 43.15, 44.9, 15
See application file for complete search history.

(56) References Cited

U.S. PATENT DOCUMENTS

| | | | | |
|---|---|---|---|---|
| 2,626,477 A * | 1/1953 | Richardson | .......................... | 43/5 |
| 2,641,078 A * | 6/1953 | Gearien | ............... | 43/5 |
| 3,267,603 A * | 8/1966 | Josephs et al. | ...................... | 43/5 |
| 3,363,355 A * | 1/1968 | Kellner | ............................... | 43/5 |
| 3,389,491 A * | 6/1968 | Lowrey | .......................... | 43/53.5 |
| 3,896,579 A * | 7/1975 | Benne | .......................... | 43/27.4 |
| 3,911,608 A * | 10/1975 | Holling | ............................... | 43/5 |
| 4,841,664 A * | 6/1989 | Baldwin | ........................... | 43/41 |
| 2006/0260172 A1 * | 11/2006 | Hufe, Jr. | ............................ | 43/5 |
| 2007/0033857 A1 * | 2/2007 | Myers | ........................... | 43/44.9 |
| 2007/0294934 A1 | 12/2007 | Myers | | |

FOREIGN PATENT DOCUMENTS

| EP | 1 541 020 A1 | 6/2005 |
|---|---|---|
| GR | 1006570 B2 | 10/2009 |
| WO | WO 9100687 A1 * | 1/1991 |

OTHER PUBLICATIONS

Mammals and Birds Excluder Device, [online], [retrieved on Oct. 28, 2010]. Retrieved from the Internet <URL:http://en.academic.ru/dic.nsf/enwiki/10508783>, whole document. 2 pgs.

* cited by examiner

*Primary Examiner* — Christopher P Ellis
(74) *Attorney, Agent, or Firm* — Birch, Stewart, Kolasch & Birch, LLP

(57) ABSTRACT

A fishing protector and a method for use of the fishing protector at or near the sea bed by long-line fishing is provided to avoid that the catch is eaten by sea mammal when the line with the catch is hauled into a fishing boat. A gliding stopper is fastened at the termination of the line and thereafter the fishing protector is hooked on the line during the setting out of the line such that the line passes through the fishing protector. By hauling of the line the line is passing through the fishing protector and the catch is hooked off inside the fishing protector. An opening and closing mechanism at a first termination of the fishing protector closes the opening through which the fish passed, avoiding fish to escape.

20 Claims, 5 Drawing Sheets

FISHING PROTECTOR

Figure 1:
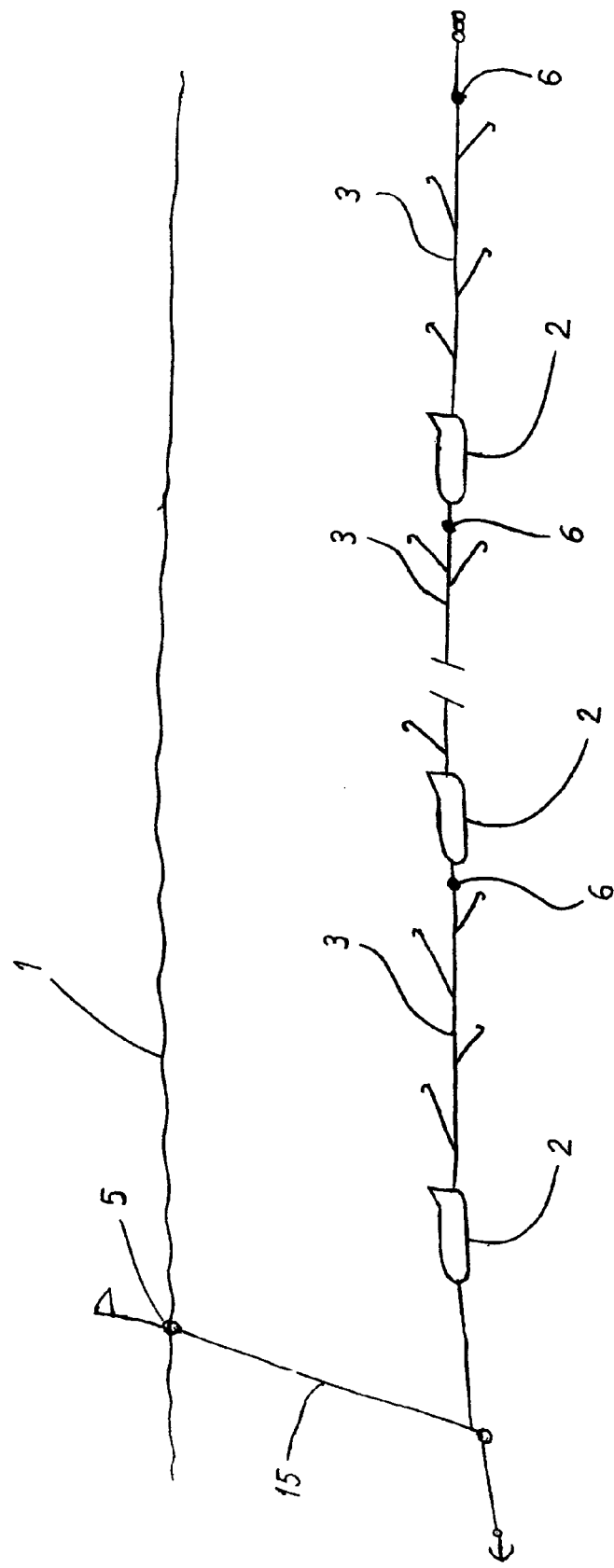

The present invention relates to a fishing protector for use at or near the sea bed by long-line fishing for collecting of fish on the line before the line with the catch in the fishing protector is hauled into a fishing boat. The Norwegian and foreign long-line fishing fleet have since the beginning of the nineties experienced increasing loss of catch due to sperm whales (*Physeter macrocephalus*) during fishing near Greenland. The whales are baiting the catch especially during fishing of halibut and Greenland halibut.

Corresponding problems are also found on the southern hemisphere during fishing of "Patagonian Toothfish" outside Chile and by fishing of halibut, Greenland halibut and "Black Cod" in the Pacific Ocean, the Bering Sea and Ohotsk Sea on the Russian side and by Greenland and New Foundland during fishing of halibut and Greenland halibut. In addition to sperm whales are killer whales (*Orchus orcha*) and other sea mammals a problem in these areas.

It is difficult to estimate the real loss, but the fishermen experience considerable decrease of catch yield. The fish which is taken is not naturally edible fish for these kinds of whales because they live on depths or areas where the whale normally does not find its meal. Whales are considered to be the biggest problem for the line-fishing fleet which is fishing in these areas, and in some areas several vessels have given up fishing due to the difficulties with whales because it is too much work and difficult to take up their quota and consequently obtain an economically surviving trade.

Another problem in this connection is that the quota that is designated and caught does not reflect the real exploitation of the different sorts of fishes because the loss to whales that eat the catch, cannot be exactly established. This may result in bigger exploitation than estimated and the result is reduced quota and even worse economy for the trade.

According to the fishermen, there has been an evident increase of the problem during the last years. The trend is an increasing number of whales on the fishing grounds, and that whales are discovered on new areas. As a result of reduced catch, several of the vessels have tried to move to other areas hoping to avoid the whales. However the sperm whales often follow the vessels, and up to now the fishermen have not succeeded in finding effective methods for reducing the problem.

Very little scientific work has been implemented in describing or solving the problems in connection with the current problem between line fishermen and tooth whales. It has been implemented experiments which have made use of shielding technology, i.e. that electronic units generating sound are fastened to the line to shield the line against whales, or sonar devices that are lowered from the vessel. Up to now the use of sound for frightening whales has been very little effective.

The problem with the whale is that it baits on the line. It steals fish hanging unprotected on the hooks when the line is hauled from the bottom. Shippers are reporting to have observed sperm whales on the echo recorder down to 1500 m and killer whales down to 1000 m, baiting on the line.

In Chile it has been made experiments to protect the fish which is caught and hanging on the hook by means of a net which shall prevent the whale from getting the fish when the line is hauled from the sea bed. This system is adapted to the Spanish method by fishing with sea bed line (ref. "Modification of fishing gear in the Chilean Patagonian Tooth fishery to minimize interactions with seabirds and tooted whales" by Carlos A. Moreno at Universidad Austral de Chile, Valdiva, and Ricardo Costa and Luis Mujica at Pesca Sur ibérica, Punta Arenas Chile).

It has also been made experiments in fishing with fish pots to protect the catch against attack from whales. The experience up to now is that fish pots are not sufficiently effective to carry out an economically profitable fishing.

The object of the present invention is to provide a protector device for the catch at or near the sea bed which is easy to operate and which is preventing that the catch is eaten by whales or other sea mammals. The protector device shall be used together with existing or today's fishing equipment. Further it is an object of the present invention to make a preliminary sorting of the fish based on size such that fish that shall not be caught, have the possibility to "escape" before they are hauled onboard the fishing vessel. According to the present invention these objects are obtained by the fishing protector with the features as stated in the claims. The invention also relates to methods for use of the fishing protector.

Figure 2:
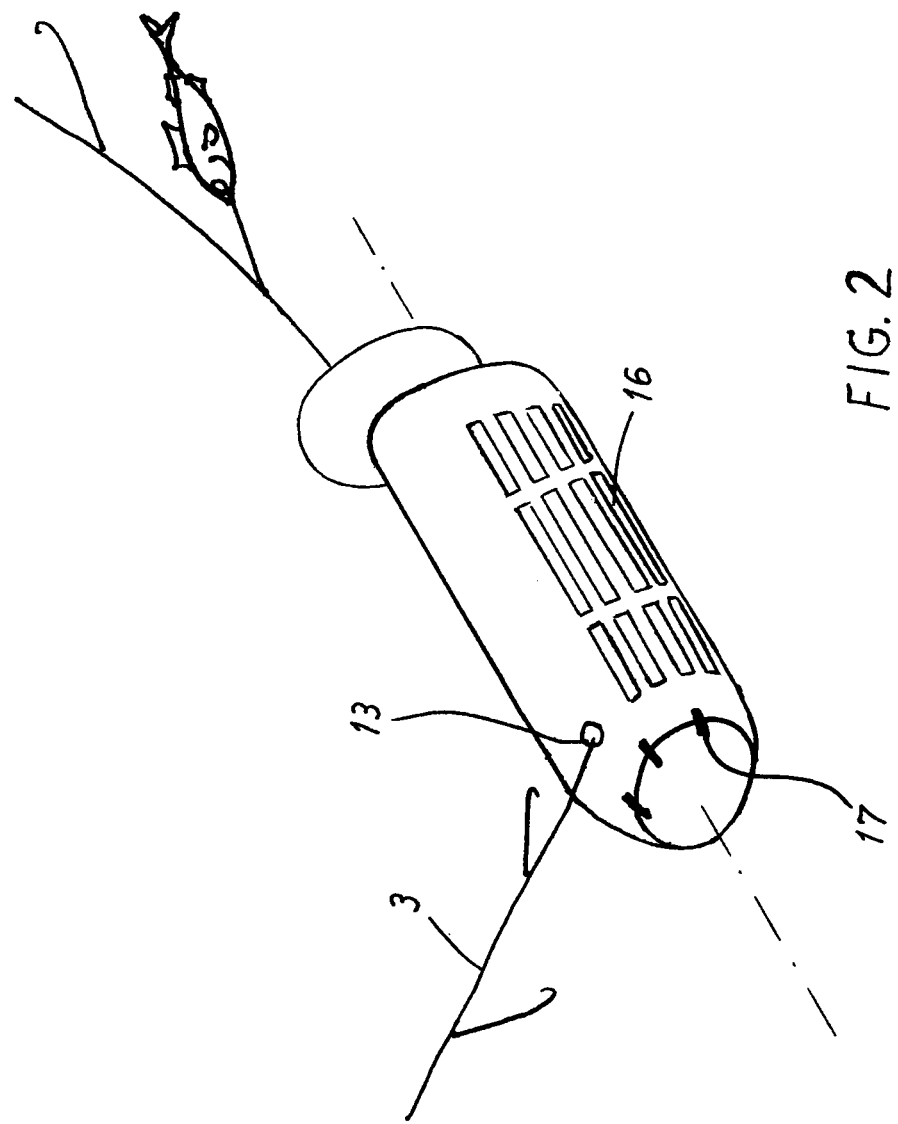
Figure 3:
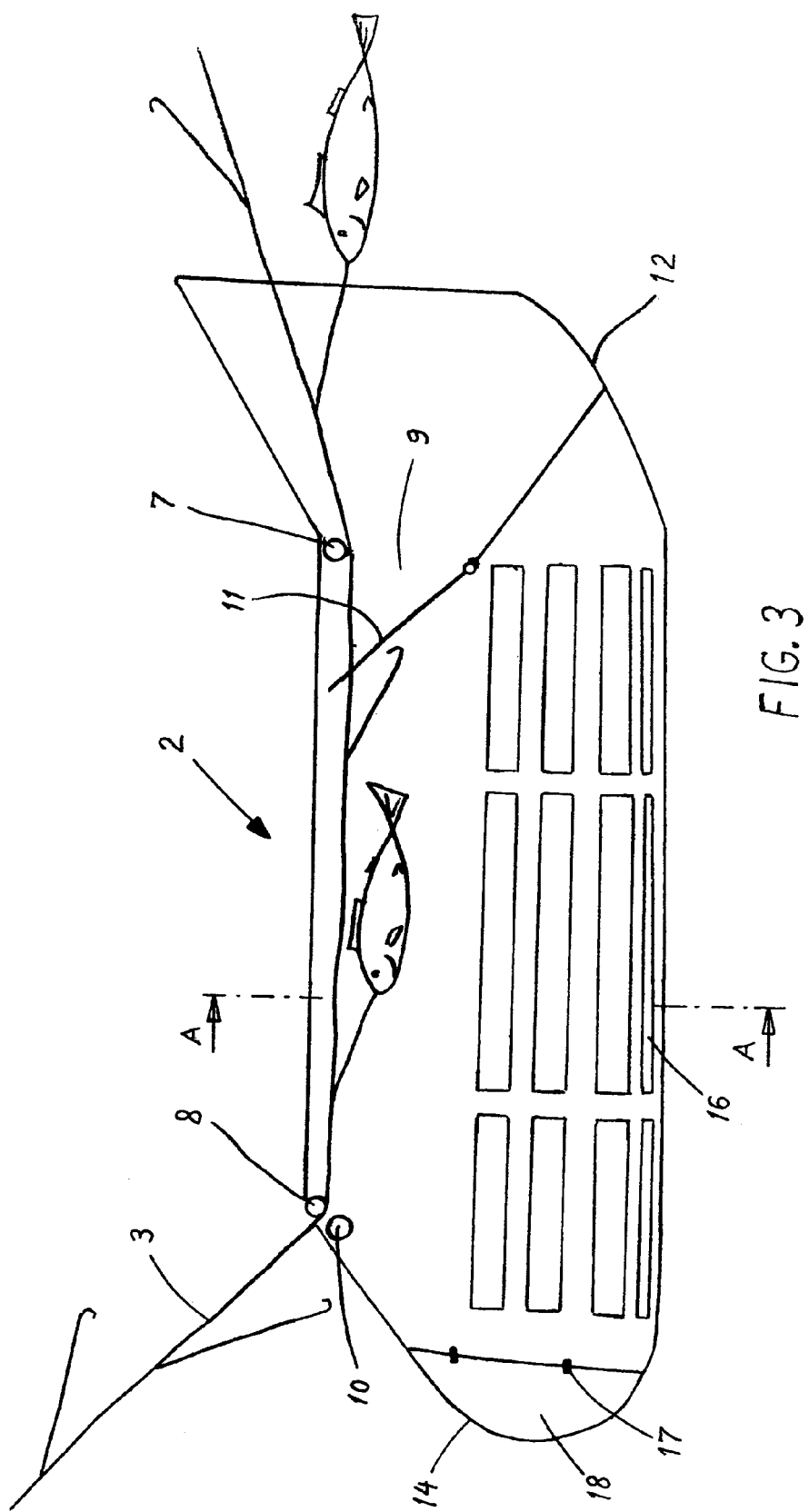
Figure 4:
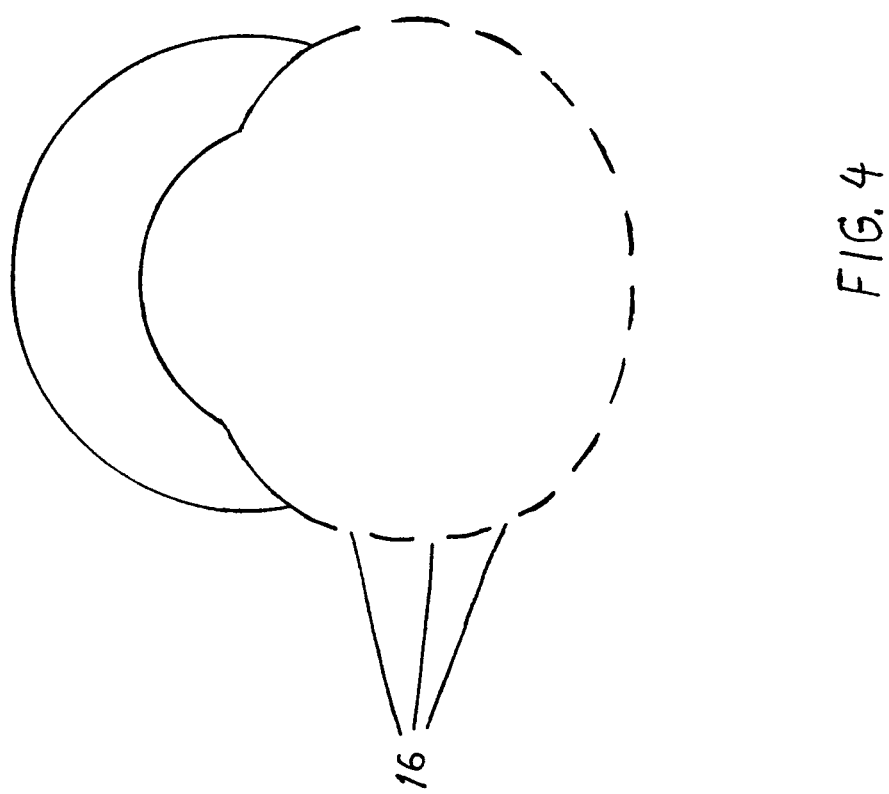
Figure 5:
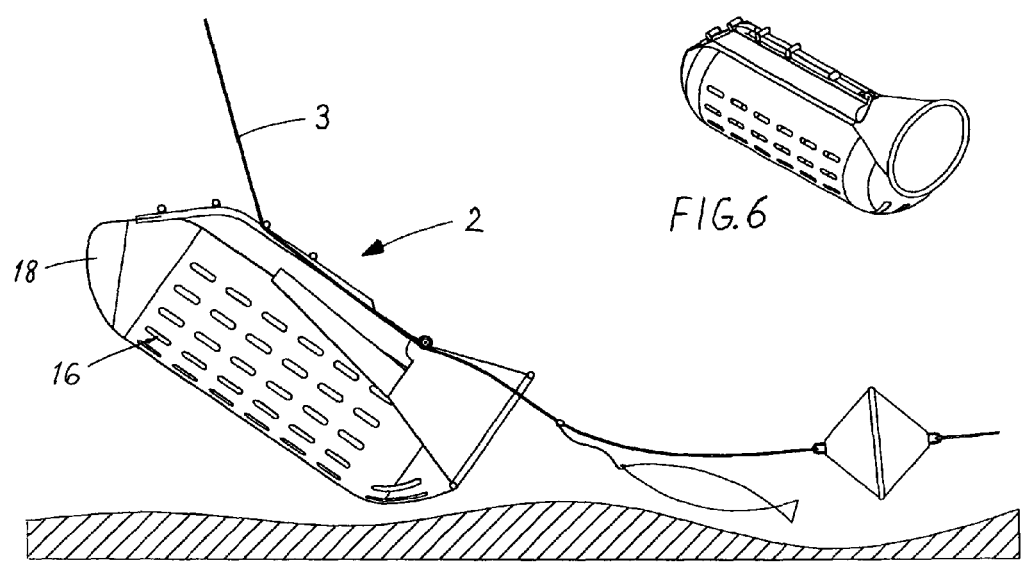

In the following the invention shall be described in detail in connection with embodiments and with reference to the drawings, wherein the FIG. 1 shows a common line where fishing protectors are located with constant spaces, and each space has a number of hooks, FIG. 2 is a perspective view of the fishing protector, FIG. 3 is a longitudinal, sectional view of the fishing protector, FIG. 4 is a sectional view of the fishing protector along the line A-A on FIG. 3, FIG. 5 is a longitudinal sectional view of an alternative embodiment of the fishing protector near the sea bed, and FIG. 6 is a perspective view of the alternative embodiment of the fishing protector.

With reference to FIG. 1, it is shown a common line arrangement on a fishing ground having at least one fishing protector 2 hooked on the line 3. The line as well as the fishing protector sink to the sea bed. The line may be provided with floating bodies to elevate parts of the line from the sea bed. At the termination of line 3 or before the next fishing protector 2, if several of them are used, it is located a gliding stopper 6.

When the line 3 is to be taken up, the hauling of the line is beginning from the marker buoy 5 on the surface 1 and begins to haul the mooring line 15 for the buoy with winch until the line 3 can be gripped and then starting to haul it with possible catch. The line may be placed on huge depths depending on the fish which is wanted to be caught and accordingly the line will be hauled inclined from the sea bed and not straight. The line 3 is guided through the fishing protector 2, and when the line is hauled, it will pass through the fishing protector 2 before it goes up towards the surface. The line 3 will pass through the fishing protector 2 at the upper part of the fishing protector, away from the central axis of the fishing protector. The fishing protector 2 is that heavy that it will glide along the line 3 and not leave the sea bed for more than short moments, i.e. some seconds at the time before it in the end shall be hauled to the surface. The fishing protector 2 may be lifted a little from the sea bed from time to time and thereafter slide a little along the line until it again meets the sea bed during this operation. The fishing protector 2 will in this way "dance" a little along the sea bed as the line is hauled little by little. In that the line is passing through the fishing protector along the upper part of the fishing protector, this makes the fishing protector directionally stable during this process, and it will not rotate around the line, but have the same side directed at the sea bed all the time due to gravitation.

Before the next fishing protector, or at the termination of the line, it is fastened a gliding stopper 6 which makes that the fishing protector cannot glide further along the line, and the fishing protector will therefore be hauled together with the line towards the surface and the vessel. On the way up the possible catch will be collected in the fishing protector and protected against attack from whales and other sea mammals.

The FIGS. 2, 3 and 4 show an embodiment of the fishing protector which is in the form of a tank. The shape of the fishing protector may be different according to the different sorts of fish to be caught, however, the function will be the same. The fishing protector may be made of e.g. steel, glass fibres, aluminium, or combinations of these, however, it may also be made of other materials.

Line 3 passes through the fishing protector 2 past at least one rounded edge which may be a pulley/roller or pipe with a rounded termination/flange, for reducing the friction against the fishing protector. Generally, it will be at least one rounded edge 7 at the insertion of the line into the fishing protector and at least one rounded edge 8 at the outlet of the line from the fishing protector. In the termination 12 of the tank into which the line is inserted, it is an opening 9 which is adapted to the fish entering the fishing protector 2. This opening is automatically closed by a spring-loaded flap which prevents the fish to run away through the opening 9. In the second termination 14 of the tank where the line is let out through an opening 13, it is a device 10 which hooks off the fish and avoiding the fish to follow the line 3 to the surface, and let it stay in the fishing protector 2. The opening 13 for the line 3, where it leaves the fishing protector 2, is too small for the fish to swim through. In avoiding the fish to swim out of the fishing protector 2 through the opening at the insertion of the line, it is arranged a device/flap 11 which opens and closes the opening 9 each time fish enter the fishing protector and thus prevents the fish running away.

Because the fish which is caught by the line is hooked off before the line goes towards the surface, the whales cannot bait on the catch on the line as the case is today. Instead the fish is collected in the fishing protector. When the fishing protector in the end is hauled towards the surface, the fishing protector will protect the catch and prevent loss of catch.

The fishing protector 2 is shaped to move through the water with as less resistance as possible when it in the end is hauled towards the surface and the vessel. Further the fishing protector is on one side provided with slots 16 or wire netting with a given mesh size so that fish which do not fulfil the catch size, may "run away" from the fishing protector after hooking off before the fishing protector is hauled into a fishing vessel on the surface.

The fishing protector 2 has a shape so that it can be used together with fishing equipment which is common in use today. Further it is easy to get off and on the line so that the fishing protector 2 fast and easy can be used if the situation requiring use of the invention, should turn up. This makes that if there are no whales on the fishing ground, there is no need to use the fishing protector, but if the whales should turn up, it is easy to use it directly. The fishing protector is able to cover catch from several hooks, so that it is not necessary to have many fishing protectors on board the fishing vessel, which again will occupy valuable space.

When the need for setting the fishing protector 2 on the line arises, there are two jobs to be done. One of the jobs consists in fastening a gliding stopper 6 on the line so that the fishing protector 2 will follow when it comes upon this gliding stopper. The second job consists in hooking the fishing protector on the line after a given number of hooks. This process will be repeated until the whole line has been set out. The sequence of the two operations is depending on how the line is set out, but has no importance for the functionality of the line. Generally it will be a gliding stopper 6 at the termination of the line in case the line has been set out without fishing protectors and the whales or sea mammals then turn up during the hauling of the line.

The gliding stopper 6 also has a function in relation to the fishing protector 2 in that it shall prevent fish that are in the fishing protector, from falling out or run away through the receiving opening 9. The gliding stopper 6 has a shape so that it will block the possibility for fish to get out through the opening 9. If the sea mammals are coming during the hauling of the line, it will be possible to hook on a fishing protector and then let the fishing protector slip down the line towards the sea bed and hook off, collect and protect fish on the way.

The fishing protector 2 may also be provided with releasing mechanism so that the fishing protector easy may be removed from the line in bad weather. Further, the fishing protector has a hatch 18 at the second termination 14 of the tank enabling emptying the catch from the fishing protector. The hatch 18 is fastened removable to the second termination 14 by means of fastening means 17. The fastening means may be hinges, hooks or clamping devices, or a combination of these.

The invention claimed is:

1. Fishing protector for use at or near the sea bed by long-line fishing for collecting of fish on the line before the line with the catch in the fishing protector is hauled into a fishing boat,
   wherein the fishing protector comprises:
   a tank for storing the catch, the tank having an opening in a first termination is for receiving fish,
   a device for hooking off the fish inside the tank,
   at least one opening for discharging liquid from the tank,
   at least one device for guiding the line through the upper part of the tank from the first termination to a second termination.

2. Fishing protector according to claim 1, wherein it comprises a device enabling the fishing protector to be hooked on the line before or during setting out the line.

3. Fishing protector according to claim 1, wherein the opening for receiving fish in the tank is provided with an opening and closing mechanism.

4. Fishing protector according to claim 1,
   wherein at least one device for guiding the line through the upper part of the tank is located on the inside of the outer wall of the tank and that the at least one device is rounded.

5. Fishing protector according to claim 1, wherein the at least one device is a pipe, pulley or metal plate.

6. Fishing protector according to claim 1, wherein the second termination has a hatch which is fastened removable to the second termination.

7. Method for use of the fishing protector according to claim 1, wherein at least one gliding stopper is fastened at the termination of the line,
   the fishing protector is thereafter hooked on the line during the setting out of the line such that the line passes through the fishing protector by the pulling of the line without letting the fishing protector come to the surface,
   the opening and closing mechanism opens the opening for letting fish into the fishing protector and closes when the fishes have passed, and the fish is hooked off when the line passes the device inside the tank.

8. Method according to claim 7, wherein the opening for receiving fish in the fishing protector is closed by a gliding stopper before the fishing protector is hauled towards the surface.

9. Fishing protector according to claim 2, wherein the opening for receiving fish in the tank is provided with an opening and closing mechanism.

10. Fishing protector according to claim 2, wherein at least one device for guiding the line through the upper part of the tank is located on the inside of the outer wall of the tank and that the at least one device is rounded.

11. Fishing protector according to claims 3, Wherein at least one device for guiding the line through the upper part of the tank is located on the inside of the outer wall of the tank and that the at least one device is rounded.

12. Fishing protector according to claim 2, wherein the at least one device is a pipe, pulley or metal plate.

13. Fishing protector according to claim 3, wherein the at least one device is a pipe, pulley or metal plate.

14. Fishing protector according to claim 4, wherein the at least one device is a pipe, pulley or metal plate.

15. Fishing protector according to claim 2, wherein the second termination has a hatch which is fastened removable to the second termination.

16. Fishing protector according to claim 3, wherein the second termination has a hatch which is fastened removable to the second termination.

17. Fishing protector according to claim 4, wherein the second termination has a hatch which is fastened removable to the second termination.

18. Fishing protector according to claim 5, wherein the second termination has a hatch which is fastened removable to the second termination.

19. Method for use of the fishing protector according to claim 2, wherein at least one gliding stopper is fastened at the termination of the line,
the fishing protector is thereafter hooked on the line during the setting out of the line such that the line passes through the fishing protector by the pulling of the line without letting the fishing protector come to the surface,
the opening and closing mechanism opens the opening for letting fish into the fishing protector and closes when the fishes have passed, and the fish is hooked off when the line passes the device inside the tank.

20. Method for use of the fishing protector according to claim 3, wherein at least one gliding stopper is fastened at the termination of the line,
the fishing protector is thereafter hooked on the line during the setting out of the line such that the line passes through the fishing protector by the pulling of the line without letting the fishing protector come to the surface,
the opening and closing mechanism opens the opening for letting fish into the fishing protector and closes when the fishes have passed, and the fish is hooked off when the line passes the device inside the tank.

* * * * *